US005099257A

United States Patent [19]

Nakazawa et al.

[11] Patent Number: 5,099,257

[45] Date of Patent: Mar. 24, 1992

[54] THERMAL HEAD WITH AN IMPROVED PROTECTIVE LAYER AND A THERMAL TRANSFER RECORDING SYSTEM USING THE SAME

[75] Inventors: Kiyohito Nakazawa; Hideo Asahi, both of Hirakata; Hitoshi Higuchi, Moriguchi, all of Japan

[73] Assignee: Matsushita Electric Industrial Co., Ltd., Osaka, Japan

[21] Appl. No.: 518,342

[22] Filed: May 3, 1990

[30] Foreign Application Priority Data

| | | | |
|---|---|---|---|
| May 10, 1989 | [JP] | Japan | 1-116952 |
| Aug. 28, 1989 | [JP] | Japan | 1-220747 |
| Mar. 26, 1990 | [JP] | Japan | 2-76014 |

[51] Int. Cl.[5] ........ B41J 2/335; G01D 15/10; G01D 15/16

[52] U.S. Cl. ........ 346/76 PH

[58] Field of Search ........ 346/76 PH; 428/906.8

[56] References Cited

U.S. PATENT DOCUMENTS

| | | | |
|---|---|---|---|
| 4,587,399 | 5/1986 | Higeta et al. | 346/76 PH |
| 4,737,799 | 4/1988 | Kato | 346/76 PH |
| 4,968,996 | 11/1990 | Ebihara et al. | 346/76 PH |

FOREIGN PATENT DOCUMENTS

| | | |
|---|---|---|
| 0133751 | 3/1985 | European Pat. Off. . |
| 59-133079 | 7/1984 | Japan . |
| 0062775 | 3/1987 | Japan . |
| 0153165 | 6/1988 | Japan . |
| 0197664 | 8/1988 | Japan . |
| 0197665 | 8/1988 | Japan . |
| 63-237964 | 10/1988 | Japan . |
| 0135659 | 5/1989 | Japan . |

*Primary Examiner*—Benjamin R. Fuller
*Assistant Examiner*—Huan Tran
*Attorney, Agent, or Firm*—Panitch Schwarze Jacobs & Nadel

[57] ABSTRACT

A thermal transfer recording system using a thermal head is disclosed. The thermal head includes protective films with different levels of thermal conductivity so that heat can be selectively and preferentially conducted to the protective film located right above the heat resistor layer, resulting in improved thermal efficiency and reduced power consumption. Because the thermal head is of an endface type, the tip of the thermal head can sufficiently protrude, which increases the stress to be applied by the thermal head onto a sheet of printing paper. This enables printing on a rough sheet. The sufficient protrusion of the tip also ensures an appropriate angle of an ink ribbon with respect to the sheet when the ink ribbon is applied to and removed from the sheet. Thus, bi-directional printing can be performed, resulting in high speed printing.

5 Claims, 8 Drawing Sheets

THERMAL HEAD WITH AN IMPROVED PROTECTIVE LAYER AND A THERMAL TRANSFER RECORDING SYSTEM USING THE SAME

BACKGROUND OF THE INVENTION

1. Field of the Invention

This invention relates generally to a thermal transfer recording system, and particularly to a thermal head adapted for inclusion in a thermal transfer recording system such as a word processor output device, a personal computer output terminal, or the like.

2. Description of the Prior Art

Recently, there has been proposed an edge-face type thermal head which enables high-speed printing to be affected on printing paper with a rough surface, without causing any trouble in the transportation of the thermal head (as described in Japanese Laid-Open Patent Publication No. 63-153165).

This type of thermal head is shown in FIG. 1, which comprises a flat substrate I of alumina or the like having a slanting surface 4 formed between a main surface 2 and an end surface 3 thereof, and also comprises a glaze layer 5 of an electrical insulating material formed on the main surface 2, the end surface 3 and the slanting surface 4. Further, an undercoat film 6 of $SiO_2$ or the like is formed on the glaze layer 5, and a plurality of heat resistor layers 7 are formed on the portion of the undercoat film 6 which is located right above the slanting surface 4. Electrode films 8 and 9 are formed on the other portions of the undercoat film 6, extending from opposite ends of each of the heat resistor layers 7 along the main surface 2 and the end surface 3, respectively. The thermal head further includes a protective film 10 of $SiO_2$ formed on the heat resistor layers 7 and part of electrodes 8 and 9 for wear resisting and anti-oxidation purposes.

One way to achieve higher-speed printing is to reduce the thickness of the protective film 10 shown in FIG. 1. However, since the protective film 10 is provided for the protection of the surface of the thermal head, the thickness of the protective film 10 cannot be reduced to a great degree.

Another conceivable way is to use a protective film having higher thermal conductivity. However, if the protective film 10 consists solely of such a protective film of higher thermal conductivity, as is the case with a conventional thermal head, the inherent function of the protective film 10 will be deteriorated, i.e., the temperature of the portion of the protective film 10 located right above the heat resistor layers 7 cannot reach a satisfactorily high level. This is apparent from the results of the thermal analysis simulation shown in FIG. 2, which shows that the temperature of the protective film located right above the heat resistor layers is decreased as the thermal conductivity of the protective film becomes higher. The reason is considered to be as follows: In the case where the thermal conductivity of the protective film 10 is high, the amount of heat transmitted from the heat resistor layers 7 to a heating area of the protective film 10 (located right above the heat resistor layers 7) is smaller than the amount of heat transmitted from the heating area of the protective film 10 to a non-heating area of the protective film 10 (located above the electrodes 8 and 9). Thus, heat is more readily conducted to the nonheating area than to the heating area, thereby decreasing the temperature of the heating area.

When a protective film of lower thermal conductivity is used, the temperature of the heating area of the protective film 10 does not become so high, as compared with the above case. Accordingly, the amount of heat transmitted from the heating area to the non-heating area of the protective film becomes small. Thus, the temperature of the heating area of the protective film 10 becomes eventually higher. In this case, however, it is difficult to raise the temperature of only the heating area of the protective film 10. This will prevent the thermal head from appropriately generating heat in accordance with print signals to be supplied form a signal generating means of the thermal transfer recording system, resulting in poor print quality.

Further, the use of a protective film having lower thermal conductivity will result in a relative increase in the flow of heat toward the undercoat film 6 and glaze layer 5 located right under the heat resistor layer 7. This causes poor thermal efficiency.

Another problem in the prior art is that, in order to decrease the size of the slanting surface 4 to allow the tip of the thermal head to further protrude, the thickness of the glaze layer 5 should be reduced. Accordingly, the heat insulating properties of the glaze layer 5 deteriorate, which increases the amount of heat to be transmitted into the glaze layer 5, resulting in increased power consumption.

A thermal head of a flat-face type which operates with good thermal efficiency for high speed printing is disclosed in Japanese Laid-Open Patent Publication No. 63-197664. This thermal head includes a glaze projection formed on a substrate of alumina or the like and protruding from the substrate to be readily brought into contact with printing paper. On the glaze projection are formed a heating element and electrodes connected to the heating element to supply current thereto. Protective films of different materials are disposed further thereon in such a manner that the thermal conductivity of the protective film on the heating element is set to be higher than that of the protective film on the other area. In such a thermal head, the heat generated by the heating element is readily conducted upward to the protective film just above the heating element, while the flow of heat to the protective film on the other area is suppressed. The purpose of this arrangement is to improve heat efficiency and to attain high speed printing.

This type of thermal head, however, cannot be used for printing on paper with a rough surface for the following reason: If this flat-face type thermal head is to be used for printing on a rough sheet of printing paper, the glaze projection of the thermal head must be of a double-layered structure to further protrude from the substrate. For that purpose, the lower glaze layer of the double-layered glaze projection should be made larger in thickness, which makes the whole glaze projection larger in thickness to a great degree. Thus, a considerable amount of heat generated by the heating element is accumulated in the glaze layers, resulting in increased power consumption. It is also impossible to attain high speed printing. With such a thermal head, it is difficult to carry out bidirectional printing because the substrate of the head interferes with such operation.

As described above, a thermal head of this type comprises protective films of different levels of thermal conductivity so as to improve thermal efficiency for the reduction of power consumption, but it cannot be used for printing on a rough sheet of printing paper or for bi-directional printing to attain higher speed printing.

SUMMARY OF THE INVENTION

The thermal transfer recording system of this invention, which overcomes the above-discussed and numerous other disadvantages and deficiencies of the prior art, includes a thermal head which comprises: a substrate having a slanting surface between its main surface and its end surface; a glaze layer formed on at least said slanting surface; a heat resistor layer formed on the portion of said glaze layer which is located on said inclined surface; a pair of electrodes each connected to either end of said heat resistor layer; and a protective layer formed on said heat resistor layer and part of said electrodes so as to cover a recording face of said thermal head, said recording face being brought into contact with a recording member at the time of thermal transfer recording operation; wherein said protective layer comprises a first protective portion disposed on said heat resistor layer and a second protective portion disposed on said part of said electrodes, the thermal conductivity of said first protective portion being higher than that of said second protective portion.

In a preferred embodiment, the glaze layer is made of a material having thermal conductivity equal to that of said second protective portion.

In a preferred embodiment, at least part of the materials of said glaze layer and said second protective portion are replaced by a polymeric material.

In a preferred embodiment, the first protective portion is made of SiC or diamond, and said second protective portion is made of a composite of SiC and SiN.

In a further preferred embodiment, the first protective portion is made of one selected from the group including SiC, a composite of SiC and SiN, SiON, graphite, BN and diamond, and said second protective portion is made of one selected from the group including a composite of SiC and SiN, $Ta_2O_5$, and glass, the respective materials of said first and second protective portions being selected in such a manner that the thermal conductivity of said first protective portion is higher than that of said second protective portion.

In a preferred embodiment, the slanting surface forms an angle of 45 degrees with said main surface.

Another thermal transfer recording system of the present invention includes a thermal head which comprises: a substrate having a slanting surface between its main surface and its end surface; a glaze layer formed on at least said slanting surface; a heat resistor layer formed on the portion of said glaze layer which is located on said inclined surface; a pair of electrodes each connected to either end of said heat resistor layer; and a protective layer formed on said heat resistor layer and part of said electrodes so as to cover a recording face of said thermal head, said recording face being brought into contact with a recording member at the time of the thermal transfer recording operation; wherein said protective layer comprises a first protective portion disposed on said heat resistor layer and a second protective portion disposed on said part of said electrodes, the thermal conductivity of said first protective portion being higher than that of said second protective portion, and the thermal conductivity of said glaze layer being lower than that of said first protective portion; and wherein the slanting surface forms an angle of 45 degrees with said main surface.

Still another thermal transfer recording system of the present invention includes a thermal head which comprises: a substrate having a slanting surface between its main surface and its end surface; a glaze layer formed on at least said slanting surface; a heat resistor layer formed on the portion of said glaze layer which is located on said inclined surface; a pair of electrodes each connected to either end of said heat resistor layer; and a protective layer formed on said heat resistor layer and part of said electrodes so as to cover a recording face of said thermal head, said recording face being brought into contact with a recording member at the time of the thermal transfer recording operation; wherein said protective layer comprises a first protective portion disposed on the center area of said heat resistor layer, a second protective portion disposed on the other area of said heat resistor layer, and a third protective portion disposed on said part of said electrodes, the thermal conductivity of said first protective portion and the thermal conductivity of said third protective portion are both lower than that of said second protective portion.

In a preferred embodiment, the first protective portion disposed on the center area of said heat resistor layer is made of a composite of SiC and SiN, and said second protective portion disposed on the other area of said heat resistor layer is made of diamond or SiC, and said third protective portion disposed on said part of said electrodes is made of a composite of SiC and SiN or made of $Ta_2O_5$.

Still another thermal transfer recording system of the present invention includes a thermal head which comprises: a substrate having a slanting surface between its main surface and its end surface; a glaze layer formed on at least said slanting surface; a heat resistor layer formed on the portion of said glaze layer which is located on said inclined surface; a pair of electrodes each connected to either end of said heat resistor layer; and a protective layer formed on said heat resistor layer and part of said electrodes so as to cover a recording face of said thermal head, said recording face being brought into contact with a recording member at the time of the thermal transfer recording operation; wherein said protective layer comprises a first protective portion disposed on the center area of said heat resistor layer and a second protective portion disposed on the other area of said heat resistor layer and on said part of said electrodes, the thermal conductivity of said first protective portion being lower than that of said second protective portion.

In a preferred embodiment, the first protective portion disposed on the center area of said heat resistor layer is made of a composite of SiC and SiN or made of $Ta_2O_5$, and said second protective portion disposed on the other area of said heat resistor layer and on said part of said electrodes is made of one selected from the group including SiC and SiN, diamond and BN; the respective materials of said first and second protective portions being selected in such a manner that the thermal conductivity of said first protective portion is lower than that of said second protective portion.

A further thermal transfer recording system of the present invention comprises: a platen; a thermal head movable in the longitudinal direction of said platen; and a means for delivering print signals to said thermal head for driving it to selectively generate heat so as to perform printing while said thermal head is reciprocating in said longitudinal direction of said platen; wherein said thermal head comprises: a substrate having a slanting surface between its main surface and its end surface; a glaze layer formed on at least said slanting surface; a heat resistor layer formed on the portion of said glaze layer which is located just on said inclined surface; a pair of electrodes each connected to either end of said heat resistor layer; and a protective layer formed on said heat resistor layer and part of said electrodes so as to cover a recording face of said thermal head, said recording face being brought into contact with a recording member at the time of thermal transfer recording operation; said protective layer comprising a first protective portion disposed on said heat resistor layer and a second protective portion disposed on said part of said electrodes, the thermal conductivity of said first protective portion being higher than that of said second protective portion.

Thus, the invention described herein makes possible the objective of providing a thermal transfer recording system using a thermal head which operates with improved thermal efficiency so that electric power consumption is reduced and which can perform bidirectional printing on paper with a rough surface, thereby assuring high speed printing.

As described above, in a thermal head included in this invention, the thermal conductivity of the protective film on the heat resistor layer is higher than that of the protective film on the other area. This improves thermal efficiency and reduces electric power consumption. Since the thermal head is of an edge-face type, the tip of the thermal head is allowed to protrude sufficiently so that the stress to be applied by the head to the ink ribbon and to the printing paper is increased. This enables printing on a rough sheet of printing paper. The sufficient protrusion of the tip of the thermal head also ensures an appropriate angle of an ink ribbon with respect to the paper when the ribbon is applied to and removed from the paper, thereby facilitating bi-directional printing, resulting in high speed printing.

BRIEF DESCRIPTION OF THE DRAWINGS

The present invention may be better understood and its numerous objects and advantages will become apparent to those skilled in the art by reference to the accompanying drawings as follows.

DESCRIPTION OF THE PREFERRED EMBODIMENTS

Figure 10:
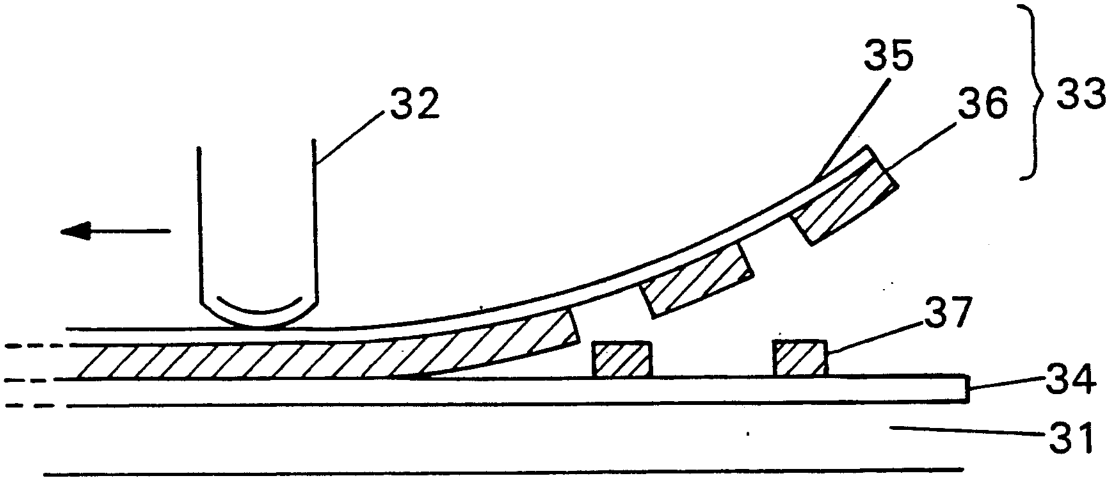
FIG. 10 is a schematic diagram showing a thermal transfer recording process.

The principle of a thermal transfer recording process underlying the thermal transfer recording system of the present invention will be described first, with reference to FIG. 10. There are provided a thermal head 32, an ink ribbon 33 and a platen 31. The thermal head 32 is movable in the longitudinal direction of the platen 31. The ink ribbon 33 comprises a base layer 35 made of polyethylene terephthalate or the like and an ink layer 36 made of a heat-melting ink. In the printing operation, the thermal head 32 is pressed against the ink ribbon 33, which is in turn pressed against a sheet of printing paper 34. At this time, the thermal head 32 selectively generates heat in a desired pattern in accordance with a print signal sent by a signal generating unit (not shown). Accordingly, the corresponding portion of the ink layer 36 is melted, so that the melted ink is transferred onto the sheet 34. Then, the thermal head 32 moves in the direction shown by the arrow, and the used portion of the ink ribbon 34 is separated from the sheet 34 so that an ink layer 37 is left on the sheet 34. In this way, the corresponding pattern is printed on the sheet 34.

The signal generating unit delivers print signals to the thermal head 32 while the thermal head 32 moves back and forth along the longitudinal direction of the platen 31, thereby enabling bidirectional printing.

The following describes examples of the thermal head adapted for use in this type of thermal transfer recording system, with reference to FIGS. 3 to 9.

(EXAMPLE 1)

Figure 1:
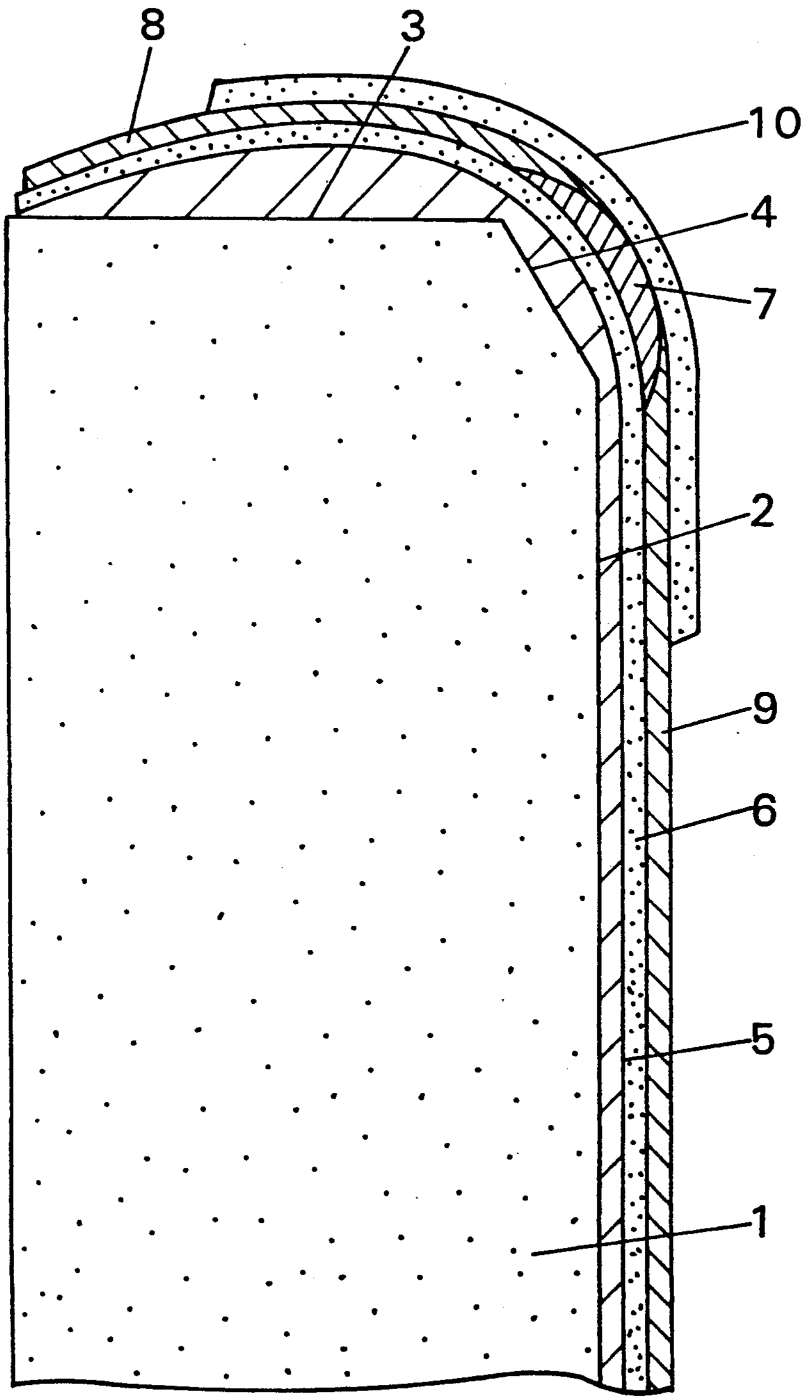
FIG. 1 is a sectional diagram showing a conventional end-face type thermal head.
Figure 2:
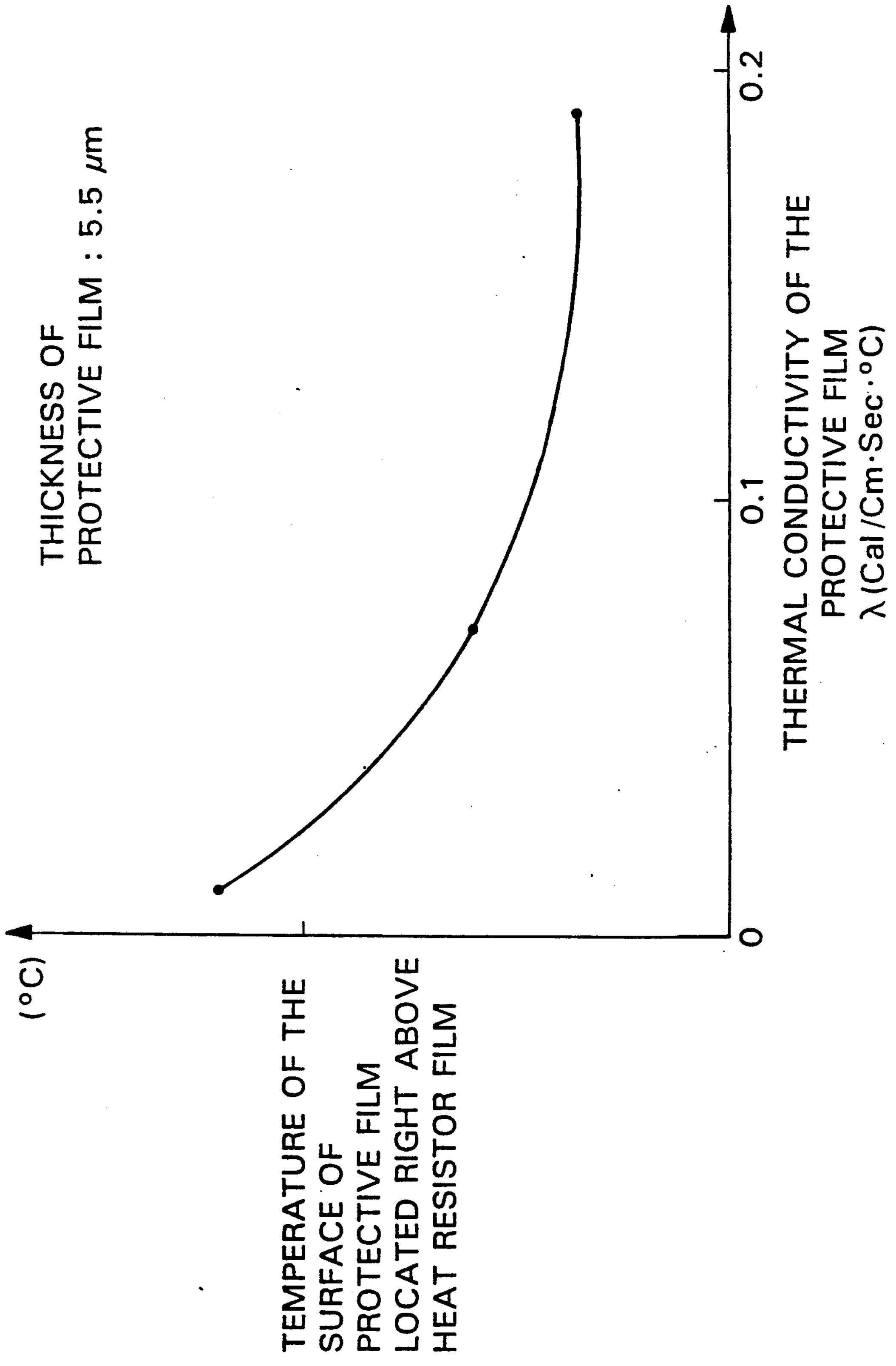
FIG. 2 is a graph showing the relationship between the thermal conductivity of a protective film and the temperature of the surface thereof.
Figure 3:
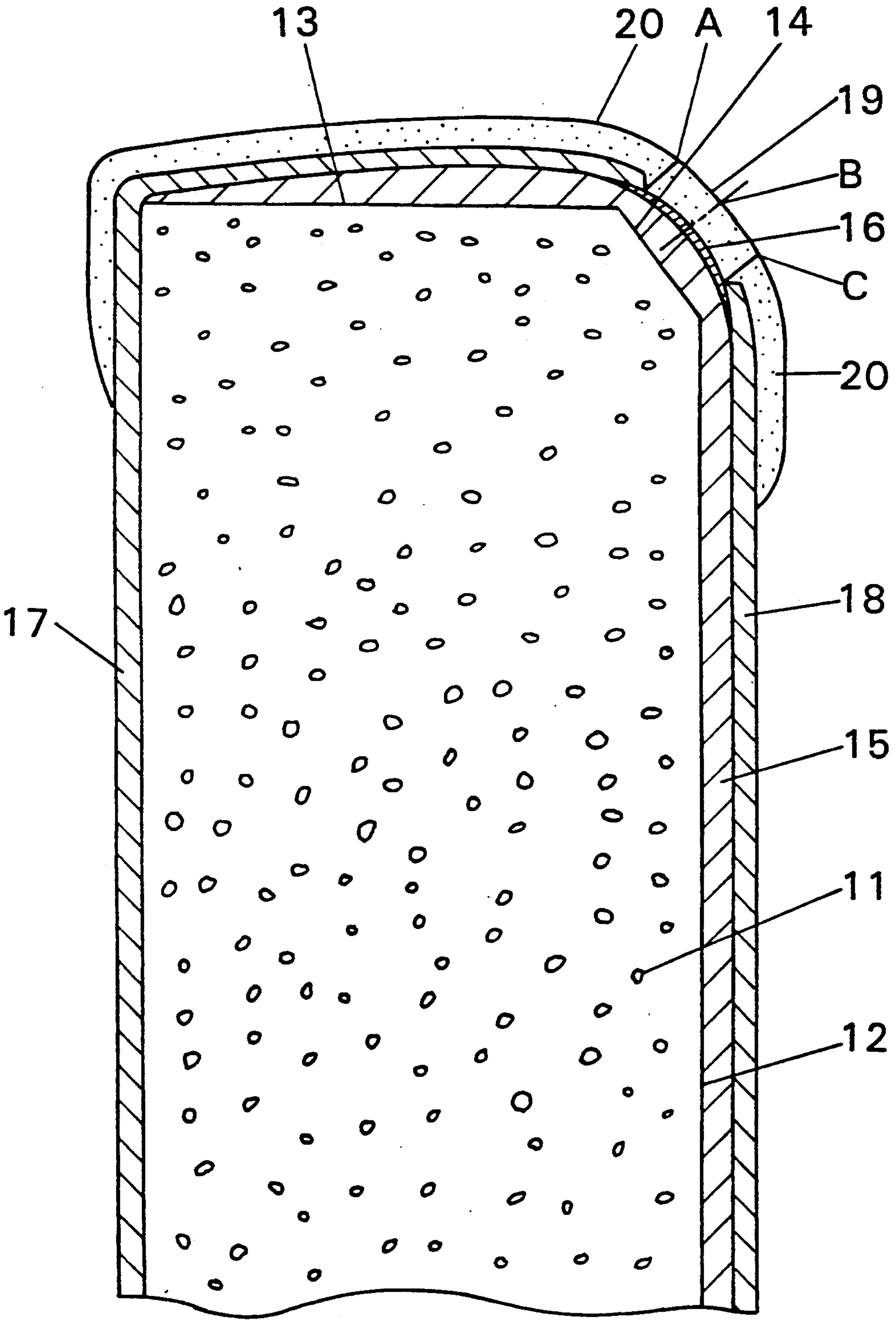
FIG. 3 is a sectional diagram showing a thermal head included in the invention.

FIG. 3 shows a cross section of a thermal head included in this invention, which comprises a substrate 11 of a ceramic material, e.g., alumina or the like, having a slanting surface 14 between a main surface 12 and an end surface 13 thereof. The slanting surface 14 has a width of 0.3 mm and forms an angle of 30 degrees with the main surface 12. On these surfaces 12, 13 and 14 is formed a glaze layer 15 of 20 $\mu m$ in thickness having low thermal conductivity and electric insulating properties. According to this invention, the width of the slanting surface 14 and the thickness of the glaze layer 15 are not limited to the above values. The angle of the slanting surface 14 with respect to the main surface 12 is not limited to 30 degrees. For example, 45 degrees is also preferable, but the angle is not limited thereto, either. A heat resistor layer 16 of $TiC\text{-}SiO_2$ is formed by sputtering on the portion of the glaze layer 15 located on the slanting surface 14. On the other portion of the glaze layer 15 are formed electrodes 17 and 18 of Cr-Cu or the like, in such a manner that they are connected to opposite ends of the heat resistor layer 16 and extend along the end surface 13 and the main surface 12, respectively. The electrodes 17 and 18 are obtained as follows: First, an electrode layer is deposited on the glaze layer 15 by sputtering, and is then formed into specified patterns by photoetching, resulting in the electrodes 17 and 18. Further, a protective film 19 of high thermal conductivity is formed on the heat resistor layer 16 and a protective film 20 of low thermal conductivity is formed on part of the other area, i.e., on part of the electrodes 17 and 18.

Thermal analysis simulations were carried out on thermal heads which were of the above-mentioned type but had different combinations of materials for the protective films 19 and 20. Six combinations of materials as listed in Table 1 were provided for the protective film 19 (of higher thermal conductivity) and the protective film 20 (of lower thermal conductivity) (cases 1 to 6). For comparison, two thermal heads which comprise protective films 19 and 20 both made of the same material were also prepared, one including protective films 19 and 20 both made of SiC having high thermal conductivity (case 7), and the other including protective films 19 and 20 both made of a composite of SiC/SiN (30/70) having low thermal conductivity (case 8). In any of the cases, the thickness of the protective film 19 was set to be 4.5 $\mu$m, and the protective film 20 was set to be 4.0 $\mu$m.

TABLE 1

| Case | Protective film 20 (low thermal conductivity) | Protective film 19 (high thermal conductivity) |
|---|---|---|
| 1 | SiC/SiN = 30/70 (sputter) | SiC (sputter) |
| 2 | $Ta_2O_5$ (sputter) | SiC/SiN = 30/70 (sputter) |
| 3 | $Ta_2O_5$ (sputter) | SiON (CVD) |
| 4 | SiC/SiN = 30/70 (sputter) | Graphite (CVD) |
| 5 | SiC/SiN = 30/70 (sputter) | BN (CVD) |
| 6 | SiC/SiN = 30/70 (sputter) | Diamond (low temp. plasma) |
| 7 | SiC (sputter) | SiC (sputter) |
| 8 | SiC/SiN = 30/70 (sputter) | SiC/SiN = 30/70 (sputter) |

Figure 4:
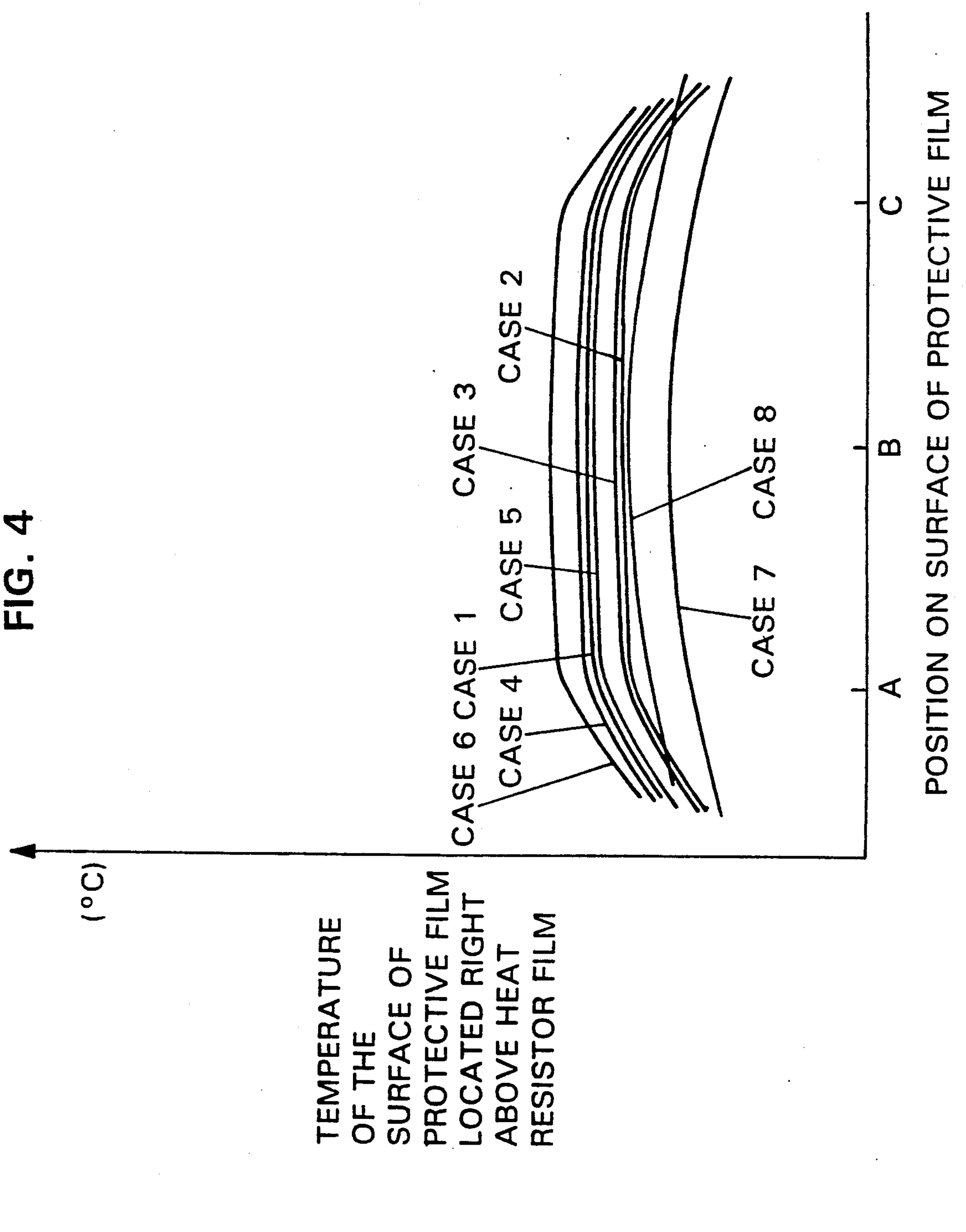
FIG. 4 is a graph showing the results of thermal analysis simulations using protective films of different materials.

FIG. 4 shows the results of the thermal analysis simulations performed on all the cases. As shown in the graph, the relationship between the temperatures of the protective films 19 in cases 1 to 8 was as follows:

case 6>case 4>case 1>case 5>case 3>case 2>case 8>case 7

Positions A, B and C shown in FIG. 4 correspond to positions A, B and C on the protective films in FIG. 3.

The thermal heads of cases 1, 5, 7 and 8 were tested for their printing quality in the following procedure. First, the temperature of the protective film 19 disposed on the heat resistor layer 16 of each thermal head was measured (at the same positions as in the above-mentioned thermal analysis simulation). The results agreed with the above results of the thermal analysis simulation within a tolerance of $\pm 3\%$. After the measurement of the temperatures, the respective thermal heads of cases 1, 5, 7 and 8 were mounted on a thermal transfer recording apparatus, and printing operations were performed. As a result, the relationship between the print densities obtained by the respective thermal heads was as follows:

case 1>case 5>case 8>case 7>

Thus, the results of the printing tests showed the same relationship as that of the above results of the thermal analysis simulations.

In the printing results of case 7 and case 8, the edges of the printed dots were noticeably blurred, as compared with those obtained in cases 1 and 5. This is attributable to the fact that there was no distinct difference in temperature between the protective films 19 and 20 since the materials of the protective films 19 and 20 were the same and thus had the same thermal conductivity.

In this embodiment, the description has been dealt with a thermal head in which there is no difference between the surface level of the protective film 19 and that of the protective film 20, but it is understood that the presence or absence of the difference in the surface level is of no particular importance. As already described, the protective film 19 (of higher thermal conductivity) is preferably formed directly on the heat resistor layer 16, but the invention is not particularly limited to this arrangement. Also in this embodiment, the protective film 19 (of higher thermal conductivity) is in contact with the electrodes 17 and 18, but the invention is not limited to such arrangement, either.

In the above-described embodiment, both the protective films 19 and 20 are of single-layer construction, but they may be of multilayer construction if desired.

If the glaze layer 15 is made of the same material as that of the protective film 20 (of low thermal conductivity), it is possible to reduce electric power consumption even when the glaze layer 15 is made thinner.

Since the thermal conductivity of the protective film 20 is only required to be lower than that of the protective film 19, the protective film 20 may be made of glass, as well as the materials described above. The above-described protective films 19 and 20 of this example are excellent in wear resistance and oxidation resistance.

As described above, the slanting surface 14 forms an angle of 30 degrees with the main surface 12, and has a width of 0.3 mm, so that the glaze layer 15 formed thereon can be made thin and the curvature of the surface of the protective films becomes large. Since the protective film 20 (of low thermal conductivity) forms a large angle with the protective film 19 (of high thermal conductivity), heat can be more selectively and preferentially conducted toward the protective film 19, and then onto an ink ribbon (not shown) during printing operation. The degree of such heat conduction becomes greater as the width of the slanting surface 14 becomes smaller.

In this way, according to the invention, since heat can be selectively and efficiently conducted in an appropriate direction, it is possible to reduce the electric power required for the operation of the thermal head. This makes it possible to extend the pulse-resistance life of the thermal head.

Furthermore, since the thermal head is of an edge-face type, it can be advantageously employed in printing on a rough sheet of printing paper and also for bi-directional printing operations. The thermal head is mounted on a carriage of a serial thermal transfer recording apparatus, and the carriage is reciprocated in the longitudinal direction of the platen, thereby performing bi-directional printing.

(EXAMPLE 2)

In Example 1, the slanting surface 14 is 0.3 mm wide and the glaze layer 15 formed thereon is 20 $\mu$m thick and is made of a material having low thermal conductivity and electric insulating properties. The thermal head of this example has the same construction as that of Example 1, except that the width of the slanting surface 14 is further reduced to increase the curvature of the surface of the protective films, so as to provide greater applicability of the head to a rough sheet of printing paper, and also except for the materials of the glaze layer 15 and the protective layer 20 of low thermal conductivity, as will be described in detail below.

Reduction in the width of the slanting surface 14 causes a decrease in the thickness of the glaze layer 15, so that the portion of the glaze layer 15 which reacts with the substrate 11 of alumina or the like is enlarged.

That is, the heat insulating properties of the glaze layer 15, which are the primary function thereof, deteriorate.

Hence, in this example, part of the glaze layer 15 is replaced by a heat-resistant polymeric material (e.g., polyethylene terephthalate, polyamide, or polyimide) having still lower thermal conductivity. As a result, the width of the slanting surface 14 can be further reduced to increase the curvature of the protective films at the tip thereof, without affecting the insulating properties of the glaze layer 15. Thus, heat can be efficiently conducted to the surface of the protective film 19 located on the heat resistor layer 16. Since the curvature of the surface of the protective films at the tip thereof is larger, more satisfactory printing results can be obtained on a rough sheet of printing paper with reduced electric power consumption, as compared with Example 1.

Part of the protective film 20 (of low thermal conductivity) may also be replaced by the above-mentioned heat resistant polymeric material. In this case, more satisfactory printing results can be obtained, as compared with the case where only the glaze layer 15 is replaced by the polymeric material.

In this way, when part of the glaze layer 15 and the protective film 20 are replaced by the abovementioned polymeric material, transmission of heat through the glaze layer 15 to the substrate 11 is restrained, and the ratio of the thermal conductivity of the protective film 19 to that of the protective film 20 is very large, thereby suppressing the transmission of heat toward the protective film 20. This allows heat to be more selectively and more efficiently conducted to the surface of the protective film 19 located on the heat resistor layer 16, so that the satisfactory printing results mentioned above can be obtained.

In this example, since the radius of curvature of the protective films 19 and 20 as a whole at the tip thereof is very small, the protective film 20 need not be in contact with printing paper when the thermal head is in the printing position, i.e., in such a position that the thermal head, the ink ribbon, and the printing paper are located one on top of the other. Thus, part of the protective film 20 may be removed. This means that part of the protective film 20 is replaced by air, which is of low thermal conductivity.

(EXAMPLE 3)

Figure 5:
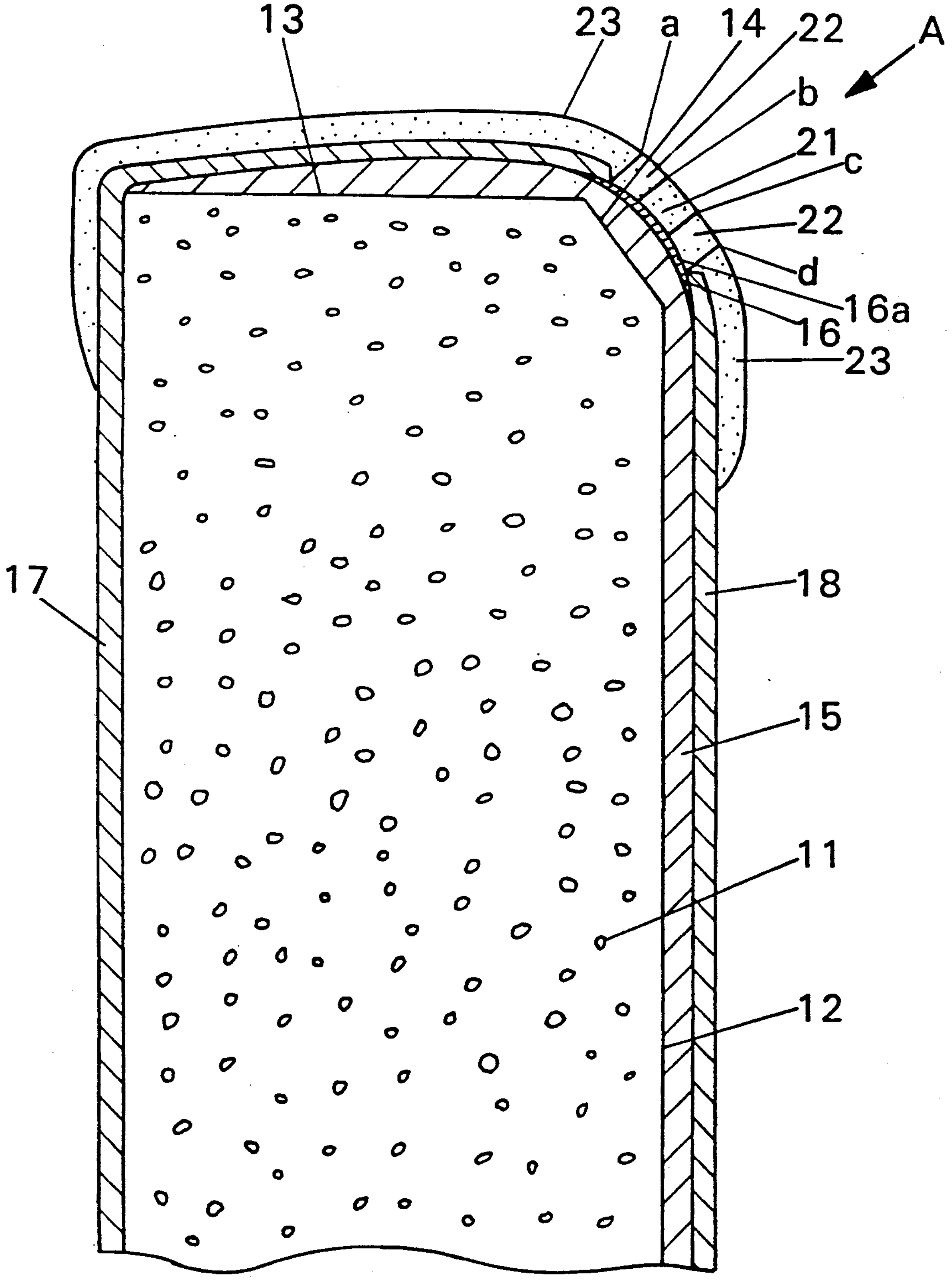
FIG. 5 is a sectional diagram showing another thermal head included in the invention.
Figure 6:
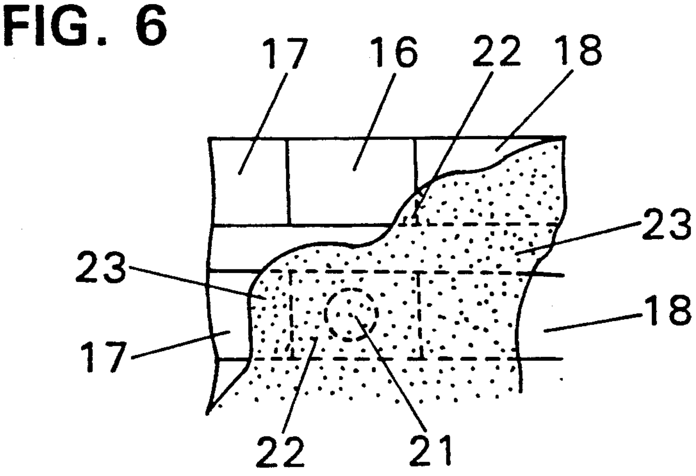
FIG. 6 is a plan view showing part of the thermal head of FIG. 5.

FIGS. 5 and 6 show another thermal head included in this invention. The construction of this thermal head is the same as that of the thermal head of Example 1, except for the arrangement of the protective films, which will be described below.

The thermal head of this example comprises a protective film 21 which is disposed on the center area of a heat generating area 16*a* (the portion of the heat resistor layer 16 located just between the electrodes 17 and 18), a protective film 22 which is disposed on the other area of the heat generating portion 16*a*, and a protective film 23 which is disposed on part of the electrodes 17 and 18. The thermal conductivity of the protective film 21 and the thermal conductivity of the protective film 23 are both lower than that of the protective film 22.

Figure 9:
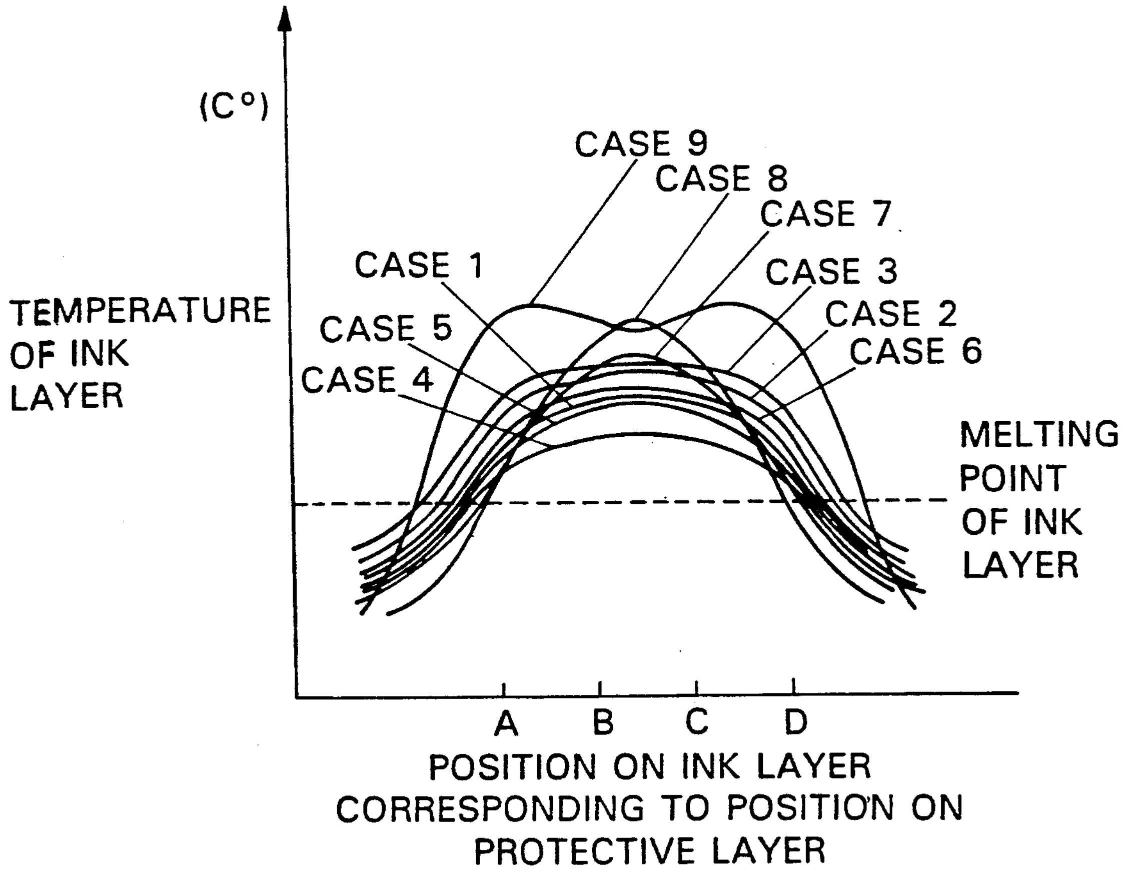
FIG. 9 is a graph showing the results of thermal analysis simulations using protective films of different materials.

Referring to FIG. 9, the curve designated by "case 9" shows the result of the thermal analysis simulation performed on the above-mentioned thermal head having the protective films 21, 22 and 23 of the materials listed in Table 2. In the thermal analysis simulation, the temperature of the ink layer heated by the above-mentioned thermal head was measured at specified positions. The positions A, B, C and D in FIG. 9 are those on the ink layer which correspond to the positions a, b, c and d on the protective films shown in FIG. 5. In case 9, since the protective film 23 is of low thermal conductivity, heat is not readily conducted to the protective film 23, so that heat can be more selectively directed toward the ink ribbon (not shown), resulting in an increased melt area of the ink layer.

TABLE 2

| Case 9 | |
|---|---|
| Protective film 21 (of low thermal conductivity) | SiC/SiN = 30/70 (sputter) |
| Protective film 22 (of high thermal conductivity) | Diamond (low temp. plasma) |
| Protective film 23 (of low thermal conductivity) | SiC/SiN = 30/70 (sputter) |

In this example, the protective film 21 and the protective film 23 are of the same material, but they may be of different materials. As long as the thermal conductivity of the protective film 23 is lower than that of the protective film 22, the effect described above remains. For example, the protective film 22 and the protective film 23 may be made of SiC and $Ta_2O_5$, respectively.

Furthermore, the protective film 23 may be removed.

In this example, as described above, the flow of heat can be more selectively and efficiently directed toward the ink ribbon, thereby further reducing the electric power required for the operation of the thermal head. Since the temperature gradient in the portion of the ink layer corresponding to the protective film 23 is steep as shown in FIG. 9, the edges of dots printed with this type of thermal head are clear.

(EXAMPLE 4)

Figure 7:
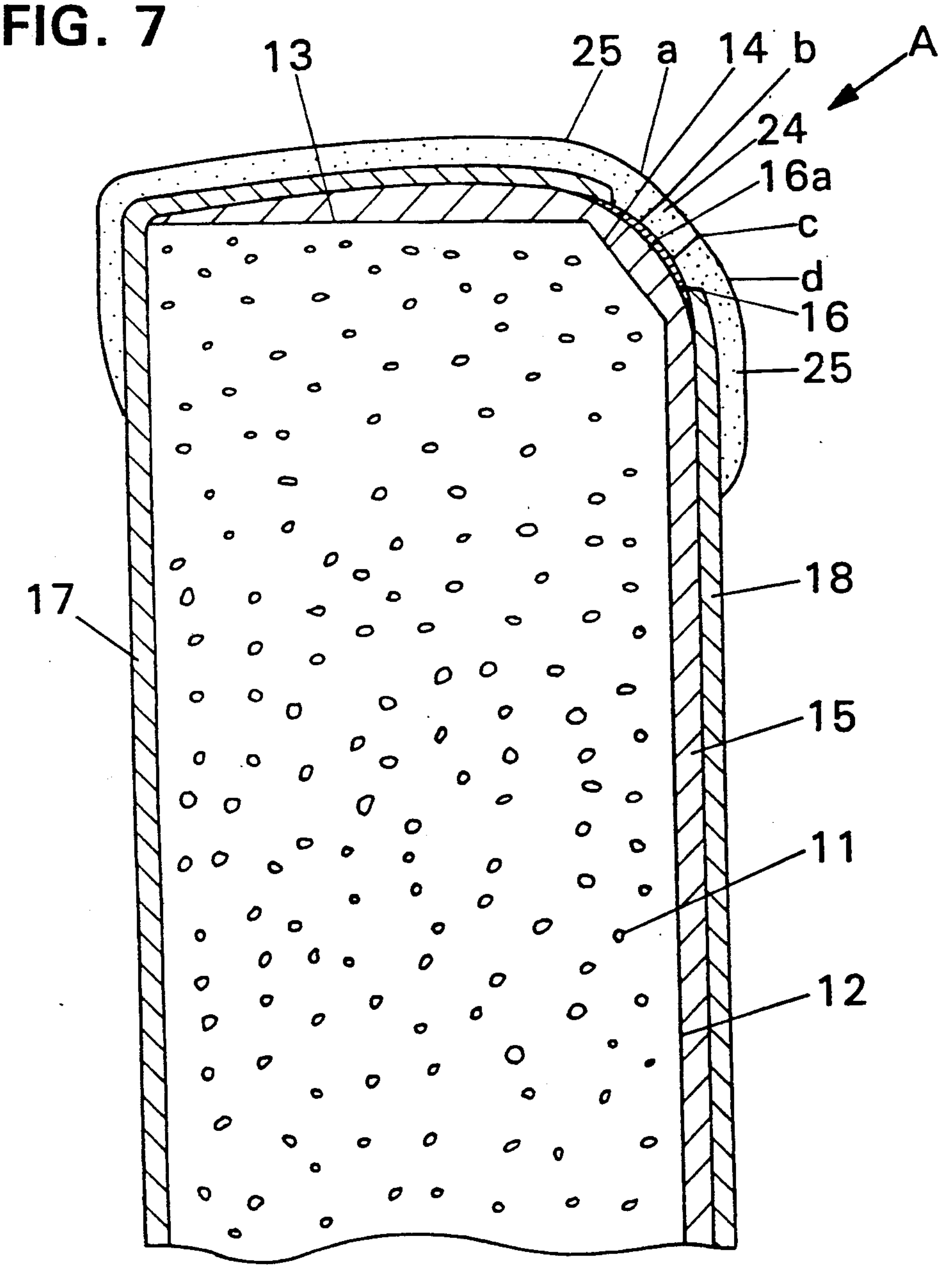
FIG. 7 is a sectional diagram showing still another thermal head included in the invention.
Figure 8:
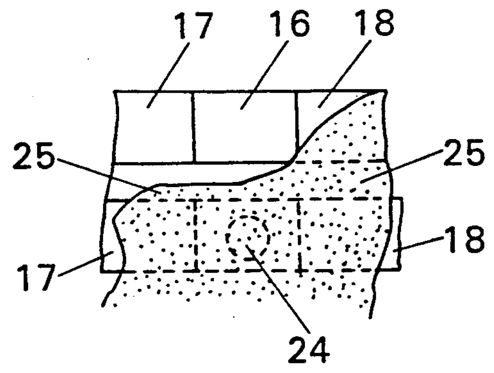
FIG. 8 is a plan view showing part of the thermal head of FIG. 7.

FIGS. 7 and 8 show still another thermal head included in this invention. The thermal head of this example has the same construction as that of the thermal head of Example 3, except for the arrangement of protective films, which will be described below.

The thermal head shown in FIGS. 7 and 8 has a protective film 24 on the center area of the heat generating area 16*a* and a protective film 25 on the other area of the heat resistor layer 16 and on part of the electrodes 17 and 18. The thermal conductivity of the protective film 24 is lower than that of the protective film 25.

Thermal analysis simulations were carried out on thermal heads which were of the above-mentioned type but had different combinations of materials for the protective films 24 and 25. Six combinations of materials as listed in Table 3 were provided for the protective film 24 (of low thermal conductivity) and the protective film 25 (of high thermal conductivity) (cases 1 to 6). For comparison, two thermal heads which comprise protective films 24 and 25 both made of the same material were also prepared, i.e., one including protective films 24 and 25 which were both made of SiC having high thermal conductivity (case 7), and the other including those which were both made of a composite of SiC/SiN (=30/70) having low thermal conductivity (case 8).

TABLE 3

| Case | Protective film 24 (low thermal conductivity) | Protective film 25 (high thermal conductivity) |
|---|---|---|
| 1 | SiC/SiN = 30/70 (sputter) | SiC (sputter) |
| 2 | $Ta_2O_5$ (sputter) | SiC (sputter) |

TABLE 3-continued

| Case | Protective film 24 (low thermal conductivity) | Protective film 25 (high thermal conductivity) |
|---|---|---|
| 3 | $Ta_2O_5$ (sputter) | SiC/SiN = 30/70 (sputter) |
| 4 | $Ta_2O_5$ (sputter) | Diamond (low temp. plasma) |
| 5 | SiC/SiN = 30/70 (sputter) | Diamond (low temp. plasma) |
| 6 | SiC/SiN = 30/70 (sputter) | BN (CVD) |
| 7 | SiC (sputter) | SiC (sputter) |
| 8 | SiC/SiN = 30/70 (sputter) | SiC/SiN = 30/70 (sputter) |

In any of the cases, the thickness of the protective film 24 and of the portion of the protective film 25 located on the heat generating area 16a was set to be 4.5 μm, and the thickness of the other portion of the protective film 25 was set to be 4.0 μm. The base layer and the ink layer of the ink ribbon (not shown) were set to be 3.5 μm and 3.0 μm in thickness, respectively.

FIG. 9 shows the results of the thermal analysis simulations performed on all the cases. In the thermal analysis simulations, the temperatures of the ink layer heated by the respective thermal heads were measured at specified positions. The positions A, B, C and D in FIG. 9 are those on the ink layer which correspond to the positions a, b, c and d on the protective films shown in FIG. 7. As shown in FIG. 9, the relationship between the sizes of the areas of the ink layer which were heated to be at or over the melting point thereof in cases 1 to 8 was as follows:

case 3>case 2>case 6>case 1>case 5>case 4>case 8>case 7

The thermal heads of cases 1, 3, 7 and 8 were tested for their printing quality by the following procedure. First, the temperature of the portion of the ink layer corresponding to the heat generating area 16a of each thermal head was measured. The measurements agreed with the above thermal analysis simulation results within a tolerance of ±3%. After the measurement of the temperatures, the thermal head of each of the cases 1, 3, 7 and 8 was mounted on a thermal transfer recording apparatus, and printing operations were performed. As a result, the relationship between the print densities obtained by the respective thermal heads was as follows:

case 3>case 1>case 8>case 7

Thus, the results of the printing tests showed the same relationship as that of the above results of the thermal analysis simulations.

In this example, there is no difference in surface level between the portion of the protective film 25 on the heat generating portion 16a and the portion of the protective film 25 on the electrodes 17 and 18. It is understood, however, the invention is not limited to the presence or absence of the surface level difference of the protective films. It is preferable that the protective films 24 and 25 are formed directly on the heat resistor layer 16 and the electrodes 17 and 18 as described above, but the invention is not limited to such arrangement.

Both the protective films 24 and 25 are of single-layer structure, but they may be of multilayered structure if desired. Since the material of the glaze layer 15 has low thermal conductivity, the protective film 24 may be of the same material as that of the glaze layer 15. In this example, the protective film 24 (of low thermal conductivity) is of circular configuration, but it may be of other shapes, as long as it has lower thermal conductivity than that of the protective film 25. The materials of the abovementioned protective films 24 and 25 of this example are excellent in wear resistance and oxidation resistance.

As described above, since the slanting surface 14 is as narrow as 0.3 mm, the glaze layer 15 formed thereon is small in thickness and the radius of curvature of the protective films as a whole is small accordingly. Thus, stress exerted on the ink ribbon (not shown) is considerably large, so that the heat can be more efficiently conducted from the thermal head to the ink ribbon.

It is understood, however, that the invention is also applicable to a thermal head of a flat-face type. In this case also, the advantageous effect of the present invention described above can be attained.

As apparent from the above description, in this example, the ink layer need not be heated to a temperature higher than that of a required level, so that the electric power required for the printing operation of the thermal head can be reduced.

As described above, the thermal head included in this invention is provided with protective films of different materials having different levels of thermal conductivity so that heat can be preferentially conducted to the portion of the protective film located just above the heat resistor layer, thereby improving the thermal efficiency to reduce the electric power consumption. Since the thermal head is of an edge-face type, the tip of the thermal head can be sufficiently projected by the reduction in the size of the slanting surface thereof, resulting in increased stress to be applied by the thermal head to the ink ribbon and to the printing paper. This enables printing on a sheet with a rough surface. The sufficient protrusion of the tip of the thermal head also ensures appropriate angles of the ink ribbon with respect to the sheet when the ribbon is applied to and removed from the sheet, and thus achieves bi-directional printing operation, resulting in high speed printing.

Further, when the glaze layer is made of a material having low thermal conductivity, the electric power required for the operation of the thermal head can be further reduced.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A thermal transfer recording system including a thermal head which comprises:

a substrate having a slanting surface between its main surface and its end surface;

a glaze layer formed on at least said slanting surface;

a heat resistor layer formed on a portion of said glaze layer which is located on said slanting surface, said heat resistor layer having a center area;

a pair of electrodes each connected to either end of said heat resistor layer; and a protective layer formed on said heat resistor layer and part of said electrodes so as to cover a recording face of said thermal head, said recording face being brought into contact with a recording member at the time of conducting a thermal transfer recording operation;

wherein said protective layer comprises a first protective portion having a thermal conductivity disposed on the center area of said heat resistor layer, a second protective portion having a thermal conductivity disposed on an area of said heat resistor layer other than said center area, and a third protective portion having a thermal conductivity disposed on said part of said electrodes, the thermal conductivity of said first protective portion and the thermal conductivity of said third protective portion are both lower than that of said second protective portion.

2. A system according to claim 1, wherein said first protective portion is made of a composite of SiC and SiN, and said second protective portion is made of diamond of SiC, and said third protective portion is made of a composite of SiC and SiN or made of $Ta_2O_5$.

3. A thermal transfer recording system including a thermal head which comprises:

a substrate having a slanting surface between its main surface and its end surface;

a glaze layer formed on at least said slanting surface;

a heat resistor layer formed on a portion of said glaze layer which is located on said slanting surface, said heat resistor layer having a center area;

a pair of electrodes each connected to either end of said heat resistor layer; and a protective layer formed on said heat resistor layer and part of said electrodes so as to cover a recording face of said thermal head, said recording face being brought into contact with a recording member at the time of conducting a thermal transfer recording operation;

wherein said protective layer comprises a first protective portion having a thermal conductivity disposed on the center area of said heat resistor layer and a second protective portion having a thermal conductivity disposed on an area of said heat resistor layer other than said center area and on said part of said electrodes, the thermal conductivity of said first protective portion being lower than that of said second protective portion.

4. A system according to claim 3, wherein said first protective portion is made of a composite of SiC and SiN or made of $Ta_2O_5$, and said second protective portion is made of one selected from the group consisting of SiC, a composite of SiC and SiN, diamond and BN, the respective materials of said first and second protective portions being selected in such a manner that the thermal conductivity of said first protective portion is lower than that of said second protective portion.

5. A thermal transfer recording system comprising:

a platen;

a thermal head movable in a longitudinal direction of said platen; and a means for delivering print signals to said thermal head for driving it to selectively generate heat so as to perform printing while said thermal head is reciprocating in said longitudinal direction of said platen, wherein said thermal head comprises:

a substrate having a slanting surface between its main surface and its end surface;

a glaze layer formed on at least said slanting surface;

a heat resistor layer formed on a portion of said glaze layer which is located on said slanting surface;

a pair of electrodes each connected to either end of said heat resistor layer; and a protective layer formed on said heat resistor layer and part of said electrodes so as to cover a recording face of said thermal head, said recording face being brought into contact with a recording member at the time of conducting a thermal transfer recording operation;

wherein said protective layer comprises a first protective portion having a thermal conductivity disposed on the center area of said heat resistor layer, a second protective portion having a thermal conductivity disposed on an area of said heat resistor layer other than said center area, and a third protective portion having a thermal conductivity disposed on said part of said electrodes, the thermal conductivity of said first protective portion and the thermal conductivity of said third protective portion are both lower than that of said second protective portion.

* * * * *

UNITED STATES PATENT AND TRADEMARK OFFICE
CERTIFICATE OF CORRECTION

PATENT NO. : 5,099,257

DATED : March 24, 1992

INVENTOR(S) : Kiyohito Nakazawa et al.

It is certified that error appears in the above-identified patent and that said Letters Patent is hereby corrected as shown below:

At item [75] of the cover page, the inventor's name should be corrected from "Hideo Asahi" to --Hideo Asai--.

Signed and Sealed this

Seventh Day of September, 1993

*Attest:*

BRUCE LEHMAN

*Attesting Officer*

*Commissioner of Patents and Trademarks*